United States Patent
Zheng et al.

(10) Patent No.: US 10,424,068 B2
(45) Date of Patent: Sep. 24, 2019

(54) IMAGE PROCESSING APPARATUS AND IMAGE PROCESSING METHOD FOR PERSON IDENTIFICATION

(71) Applicant: FUJITSU LIMITED, Kawasaki-shi, Kanagawa (JP)

(72) Inventors: Mingxie Zheng, Kawasaki (JP); Akihiro Minagawa, Tachikawa (JP); Yusuke Uehara, Kawasaki (JP); Kentaro Tsuji, Kawasaki (JP); Yuji Matsuda, Kawasaki (JP); Nobuhiro Miyazaki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/832,990

(22) Filed: Dec. 6, 2017

(65) Prior Publication Data
US 2018/0096480 A1    Apr. 5, 2018

Related U.S. Application Data

(62) Division of application No. 15/013,514, filed on Feb. 2, 2016, now Pat. No. 9,870,618.

(30) Foreign Application Priority Data

Feb. 23, 2015 (JP) ................................ 2015-032765

(51) Int. Cl.
G06T 7/174 (2017.01)
G06K 9/00 (2006.01)

(52) U.S. Cl.
CPC .......... G06T 7/174 (2017.01); G06K 9/00369 (2013.01)

(58) Field of Classification Search
CPC ........................... G06T 7/174; G06K 9/00369
See application file for complete search history.

(56) References Cited

U.S. PATENT DOCUMENTS

2012/0159290 A1  6/2012  Pulsipher
2012/0201468 A1* 8/2012  Oami ................. G06K 9/00362
                                               382/199
2013/0259374 A1  10/2013  He

FOREIGN PATENT DOCUMENTS

JP    04-112391      4/1992
JP    2006-146378    6/2006
(Continued)

OTHER PUBLICATIONS

Shu, Guang, et al. "Part-based multiple-person tracking with partial occlusion handling." Computer Vision and Pattern Recognition (CVPR), 2012 IEEE Conference on. IEEE, 2012.*
(Continued)

*Primary Examiner* — Menatoallah Youssef
(74) *Attorney, Agent, or Firm* — Fujitsu Patent Center

(57) ABSTRACT

An apparatus for identifying a candidate area in a first image corresponding to an object in a second image, includes a memory and a processor to divide the plurality of candidate areas into a plurality of small candidate areas, divide an image area of the object into a plurality of small areas, perform first comparison processing for a first part, when there is a first candidate area lacking image information of the small candidate area corresponding to the first part, perform second comparison processing for a second part, predict missing result on the small candidate area corresponding to the first part in the first candidate area based on a result of the first comparison processing on a candidate area other than the first candidate area, and a result of the second comparison processing on the plurality of candidate areas, and identify the candidate area based on a prediction.

2 Claims, 13 Drawing Sheets

(56) References Cited

FOREIGN PATENT DOCUMENTS

| JP | 2012-252613 | 12/2012 |
|----|-------------|---------|
| JP | 2014-192700 | 10/2014 |

OTHER PUBLICATIONS

Shu, Guang, et al. "Part-based multiple-person tracking with partial occlusion handling." Computer Vision and Pattern Recognition (CVPR), 2012 IEEE Conference on. IEEE, 2012. (Year: 2012).*
D. Qin et al., "A Human Body Part Segmentation Method Based on Markov Random Field", International Conference on Control Engineering and Communication Technology (ICCECT), 2012 (4 pages).
USPTO, (Youssef) Restriction Requirement, dated Jul. 28, 2017, in U.S. Appl. No. 15/013,514 [pending].
USPTO, (Youssef) Notice of Allowance and Notice of Allowability, dated Oct. 6, 2017, in U.S. Appl. No. 5/013,514 [pending].

* cited by examiner

FIG. 6

| PART | START POINT COORDINATES (sx, sy) | END POINT COORDINATES (ex, ey) | FEATURE QUANTITY |
|---|---|---|---|
| HAIR | (20,10) | (40,15) | (10,11,10) |
| FACE | (20,15) | (40,35) | (229,190,149) |
| ... | ... | ... | ... |
| SHOES | (10,90) | (45,95) | (33,89,104) |

FIG. 10

| PART | FACE | SHOES | HAIR |
|---|---|---|---|
| CERTAINTY FACTOR | 80% | 60% | 40% |
| PRIORITY | 1 | 2 | 3 |

FIG. 12

| ID | FACE | SHOES | HAIR |
|----|------|-------|------|
| A2 | MISSING | 50 | MISSING |
| B2 | 65 | 10 | 60 |
| C2 | 80 | 10 | 50 |
| D2 | 75 | MISSING | 40 |

IMAGE PROCESSING APPARATUS AND IMAGE PROCESSING METHOD FOR PERSON IDENTIFICATION

CROSS-REFERENCE TO RELATED APPLICATION

This application is a divisional of application Ser. No. 15/013,514, filed Feb. 2, 2016, which is based upon and claims the benefit of priority of the prior Japanese Patent Application No. 2015-032765, filed on Feb. 23, 2015, the entire contents of which are incorporated herein by reference.

FIELD

The embodiments discussed herein are related to image processing.

BACKGROUND

In person identification as an anticrime measure, when a newly captured image is matched with an image captured in advance, processing for associating the same person in the two images is sometimes performed. Also, in a flow line analysis of a person, processing for associating the same person in the two images captured by two cameras is sometimes performed. In such processing, a still image or a video is used.

In a flow line analysis, association is carried out using images of the entire body of a person, and various parts of the body is used as features. In this case, the features of individual parts are extracted from the two images and used for comparison, and it is possible to consider a most similar person as the same person based on the similarity degrees of the features.

A pattern identification method for identifying an input pattern of an image, or the like using a binary tree table is disclosed in Japanese Laid-open Patent Publication No. 4-112391, for example. In this pattern identification method, a feature vector is generated from the input pattern, and pattern identification is performed by referencing a binary tree table regarding the pattern predicted as a candidate category provided in advance from this feature vector.

An image segmentation method for segmenting an image of a human body into parts is disclosed, for example, in D. Qin, Q. Jianzhong, L. Fang, S. Xiangbin, D. Qin and Y. Hongping, "A Human Body Part Segmentation Method Based on Markov Random Field," International Conference on Control Engineering and Communication Technology (ICCECT), 2012.

SUMMARY

According to an aspect of the invention, an image processing apparatus for identifying a candidate area, from among a plurality of candidate areas in a first image, corresponding to an object in a second image, includes a memory and a processor coupled to the memory and configured to divide the plurality of candidate areas in the first image into a plurality of small candidate areas, respectively, divide an image area of the object in the second image into a plurality of small areas, perform, regarding each of the plurality of candidate areas, first comparison processing for comparing a small area corresponding to a first part with a small candidate area corresponding to the first part, the first part being a part of the object, when there is no a first candidate area lacking image information of the small candidate area corresponding to the first part, identify the candidate area corresponding to the object based on a result of the first comparison processing, and when there is the first candidate area, perform second comparison processing for comparing another small area corresponding to a second part with another small candidate area corresponding to the second part for each of the plurality of candidate areas, the second part being different from the first part, predict missing result on the small candidate area corresponding to the first part in the first candidate area based on the result of the first comparison processing on a candidate area other than the first candidate area, and a result of the second comparison processing on the plurality of candidate areas, and identify the candidate area corresponding to the object based on the result of the first comparison processing and a result of a prediction.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a diagram illustrating feature information;

FIG. 10 is a diagram illustrating certainty factor information;

FIG. 12 is a diagram illustrating a similarity degree of each part; and

DESCRIPTION OF EMBODIMENTS

The related-art image processing has the following problems.

In a flow line analysis, or the like, feature extraction from an image sometimes fails depending on the installation condition of a camera. In particular, when the optical axis of a camera is close to horizontal, for example, a person is blocked by another person or an object so that an image of a partial part of the person is sometimes not captured. In such a case, the features allowed to be used for comparing the two images are restricted, and thus it becomes difficult to correctly associate the two images.

In this regard, such a problem arises not only when person identification or a flow line analysis is performed in order to take an anticrime measure, but also when the same person is associated between two images in the other image processing.

According to an embodiment of the present disclosure, it is desirable to compare persons in images with high precision even if a part of an area in an image is not suitable for calculating a similarity degree.

In the following, a detailed description will be given of the embodiment with reference to the drawings.

Figure 1:
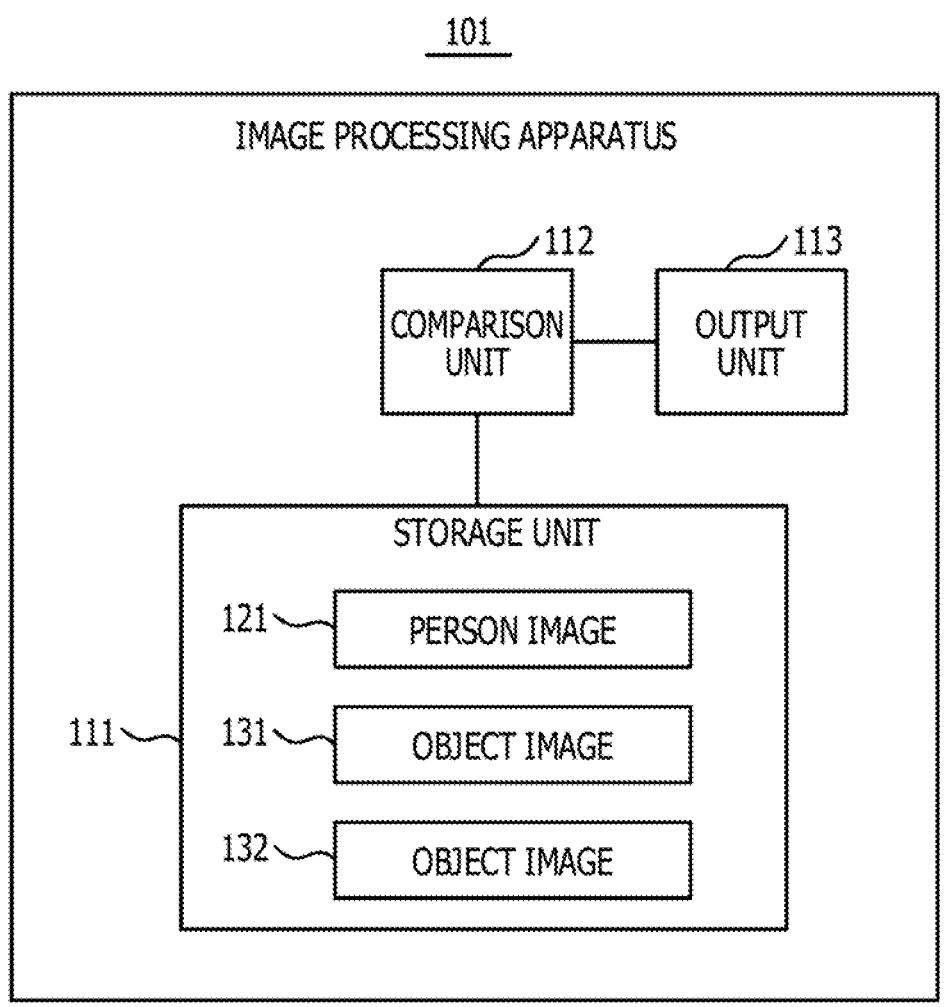
FIG. 1 is a functional configuration diagram of an image processing apparatus.

FIG. 1 illustrates an example of a functional configuration of an image processing apparatus according to the embodiment. An image processing apparatus 101 includes a storage unit 111, a comparison unit 112, and an output unit 113.

The storage unit 111 stores a person image 121, and a plurality of object images corresponding to a plurality of persons, respectively. The person image 121 includes a first area and a second area. An object image 131 out of the plurality of object images includes a third area corresponding to the first area, and a fourth area corresponding to the second area. An object image 132 out of the plurality of object images includes a fifth area corresponding to the first area, and a sixth area corresponding to the second area.

The comparison unit 112 generates a comparison result by comparing the person image 121 with the plurality of object images, and the output unit 113 outputs the comparison result.

Figure 2:
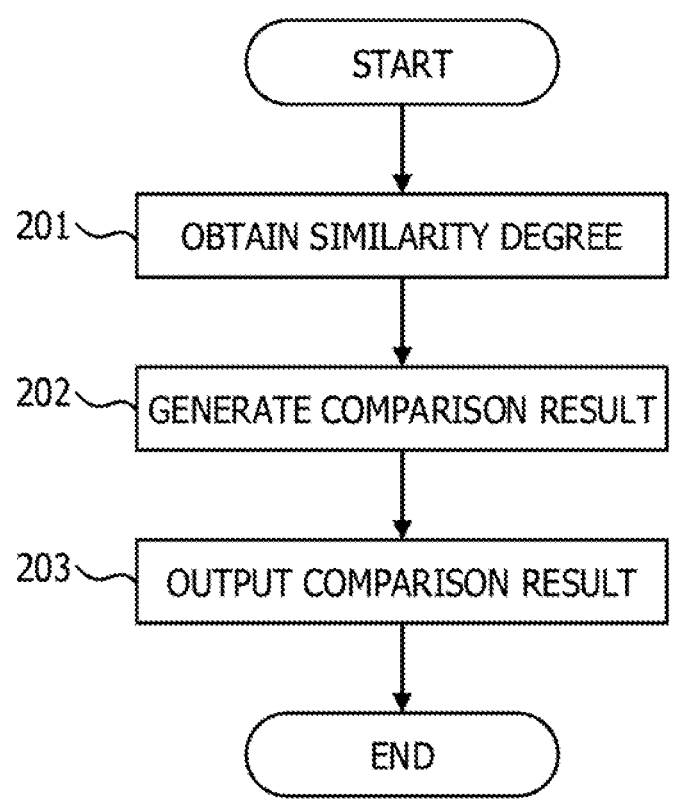
FIG. 2 is a flowchart of image processing.

FIG. 2 is a flowchart illustrating an example of image processing performed by the image processing apparatus 101 in FIG. 1. If the feature quantity of the third area is not suitable for calculating a similarity degree, the comparison unit 112 obtains a fourth similarity degree between the feature quantity of the first area and the feature quantity of the third area based on a first similarity degree, a second similarity degree, and a third similarity degree (step 201). The first similarity degree is a similarity degree between the feature quantity of the first area and the feature quantity of the fifth area, the second similarity degree is a similarity degree between the feature quantity of the second area and the feature quantity of the fourth area, and the third similarity degree is a similarity degree between the feature quantity of the second area and the feature quantity of the sixth area.

Then the comparison unit 112 generates a comparison result by comparing the person image with the plurality of object images based on the first similarity degree and the fourth similarity degree (step 202), and the output unit 113 outputs the comparison result (step 203).

With the image processing apparatus 101 in FIG. 1, it is possible to compares persons between images with high precision even if a part of an area in the images is not suitable for similarity degree calculation.

Figure 3:
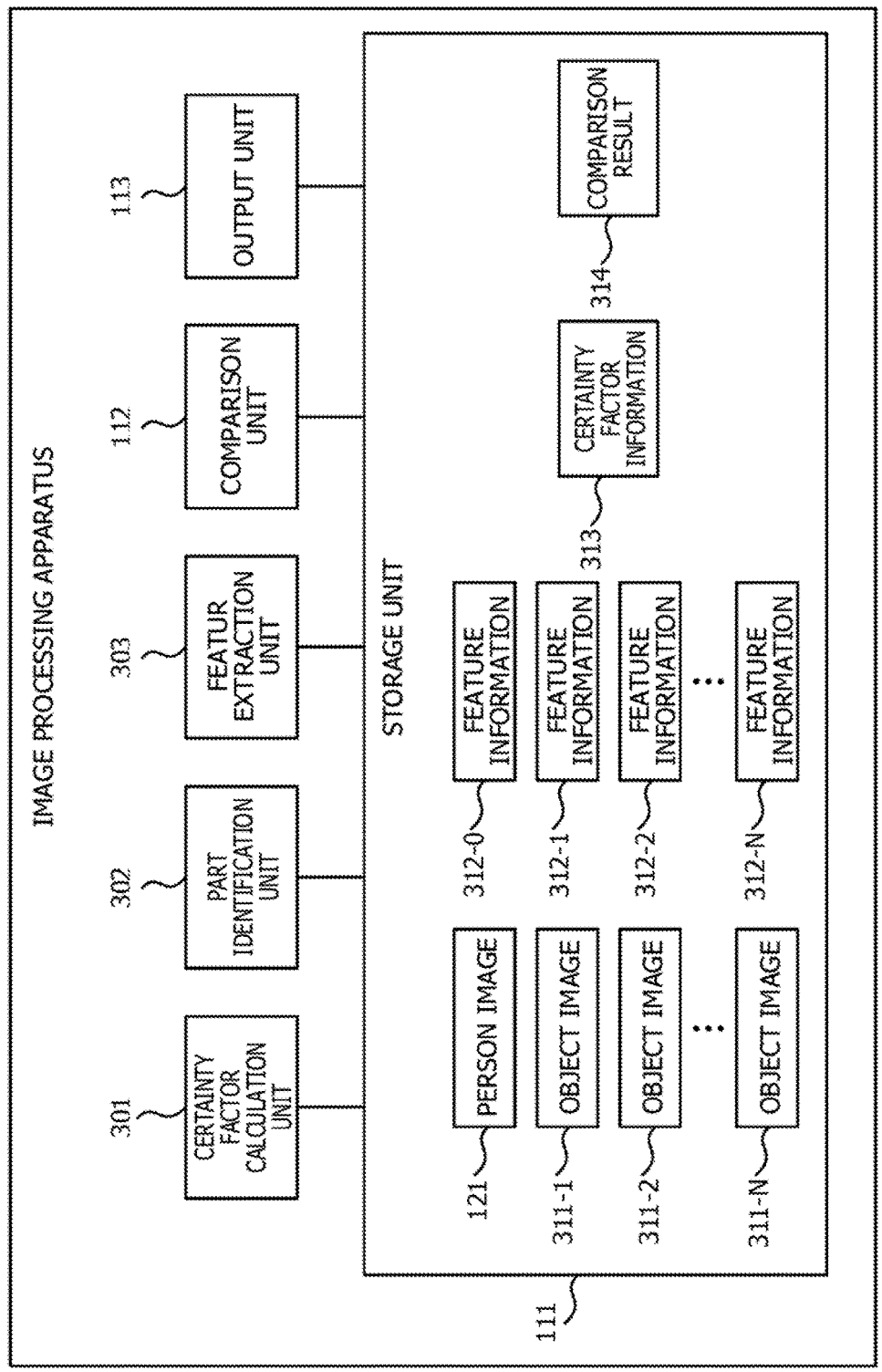
FIG. 3 is a functional configuration diagram illustrating a specific example of the image processing apparatus.

FIG. 3 illustrates a specific example of the image processing apparatus 101 in FIG. 1. The image processing apparatus 101 in FIG. 3 includes a storage unit 111, a comparison unit 112, an output unit 113, a certainty factor calculation unit 301, a part identification unit 302, and a feature extraction unit 303.

The storage unit 111 stores the person image 121, and N pieces of object image 311-1 to object image 311-N corresponding to N persons (N is an integer of two or more), respectively. For example, the person image 121 is a person image included in an image captured by a first camera, and the object image 311-1 to object image 311-N are person images included in an image captured by a second camera.

Figure 4:
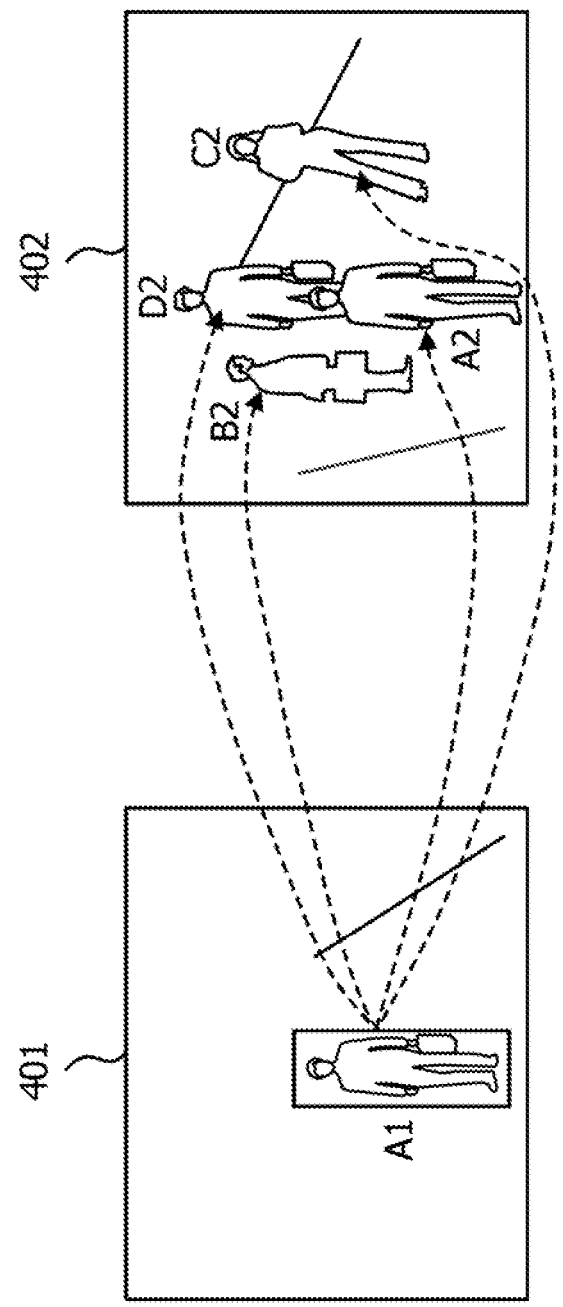
FIG. 4 is a diagram illustrating two images captured by two cameras.

FIG. 4 illustrates an example of two images captured by two cameras. An image 401 captured by a first camera includes a person A, and an image captured by 402 captured by a second camera includes a person A, a person B, a person C, and a person D. In this case, A1 is given to the image of the person A in the image 401 as identification information (ID), and A2, B2, C2, and D2 are given to the images of the person A, the person B, the person C, and the person D, respectively, in the image 402 as ID.

The image processing apparatus 101 compares the image A1 with each of the image A2, the image B2, the image C2, and the image D2, and identifies a person in the image 402 corresponding to the image A1. The image A1 extracted from the image 401 is stored in the storage unit 111 as the person image 121, and the image A2, the image B2, the image C2, and the image D2 that are extracted from the image 402 are stored in the storage unit 111 as object image 311-1 to object image 311-4. In this case, N=4.

The part identification unit 302 identifies an area corresponding to each part of a body from each of the person image 121 and the object image 311-1 to the object image 311-N, and divides each of the images into a plurality of the identified areas. It is possible for the part identification unit 302 to divide each of the images into a plurality of areas corresponding to a plurality of parts, respectively, using the image segmentation method of the following non-patent literature, for example. D. Qin, Q. Jianzhong, L. Fang, S. Xiangbin, D. Qin and Y. Hongping, "A Human Body Part Segmentation Method Based on Markov Random Field," International Conference on Control Engineering and Communication Technology (ICCECT), 2012.

Figure 5:
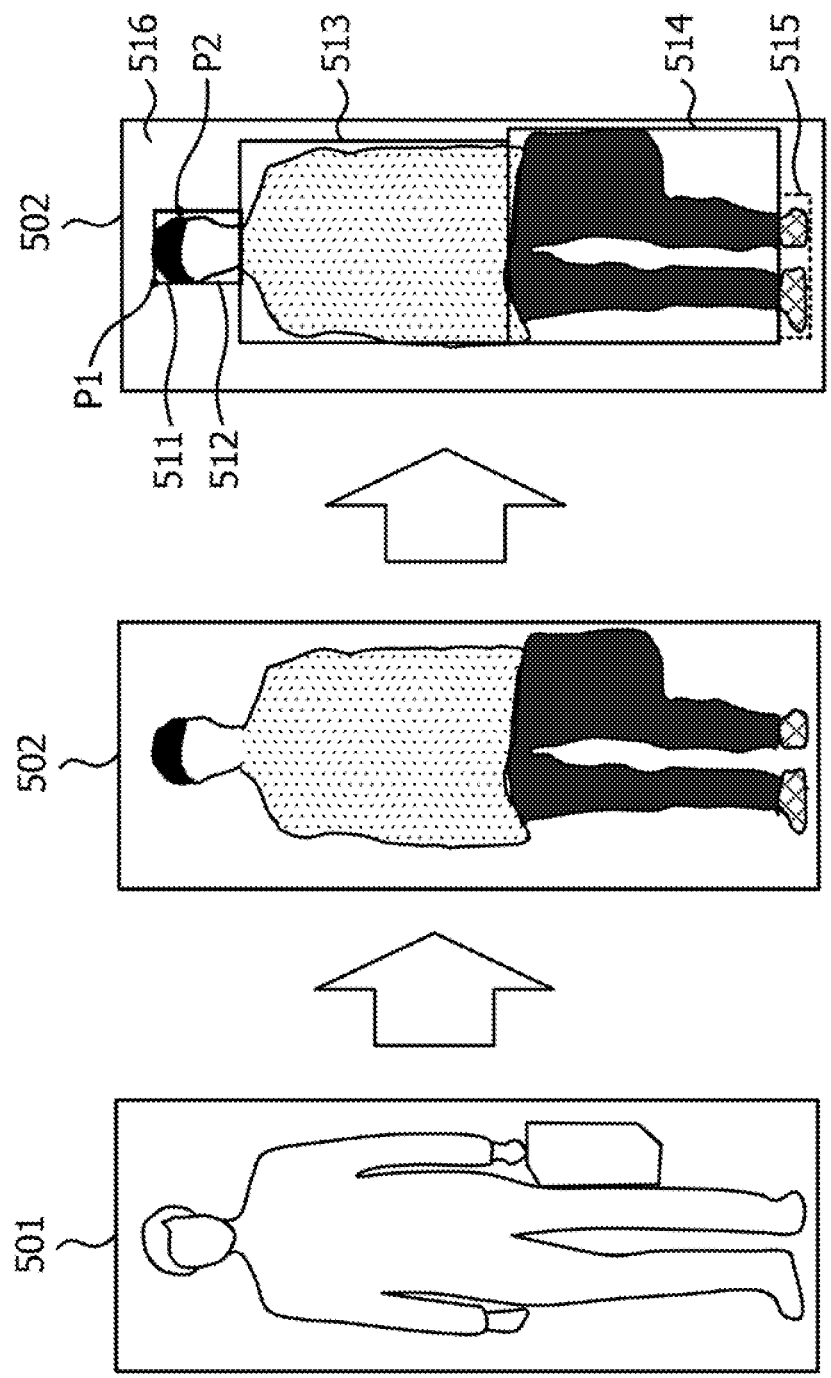
FIG. 5 is a diagram illustrating an example of areas corresponding to individual parts of a body.

FIG. 5 illustrates an example of areas corresponding to individual parts of a body. The part identification unit 302 generates a map image 502 in which five parts, namely, hair, a face, an upper body, a lower body, and shoes are distinguished from a person image 501, and divides the map image 502 into an area 511 to an area 516. The area 511 corresponds to hair, the area 512 corresponds to a face, the area 513 corresponds to an upper body, the area 514 corresponds to a lower body, the area 515 corresponds to shoes, and the area 516 corresponds to a background portion.

The part identification unit 302 records a position and size information of an area of each part obtained from the person image 121 in the feature information 312-0. Also, the part identification unit 302 records a position and size information of an area of each part obtained from the object images 311-1 to the object image 311-N in a corresponding one of the feature information 312-1 to the feature information 312-N.

FIG. 6 illustrates an example of the feature information 312-0 to the feature information 312-N. The feature information in FIG. 6 corresponds to the map image 502 in FIG. 5, start point coordinates (sx, sy) represent coordinates of an upper left vertex of an area corresponding to a part, and end point coordinates (ex, ey) represent coordinates of a lower right vertex of the area.

In this example, the coordinate origin is the upper left vertex of the map image 502, and the width and the height of the map image 502 are 50 and 100, respectively. For example, the coordinates of a start point P1 of the hair area 511 are (20, 10), and the coordinates of an end point P2 are (40, 15). It is possible to express the position and the size of the area of each part by start point coordinates (sx, sy) and end point coordinates (ex, ey).

The feature extraction unit 303 extracts feature quantities from areas of individual parts in the map images generated from the person image 121 and the object image 311-1 to the object image 311-N, respectively, and records the feature quantities in the feature information 312-0 to the feature information 312-N, respectively. For the feature quantities, it is possible to use information on a color of an area, a color difference signal, a gray level, a brightness, a shape, a texture, an edge, a contour, and the like. For the contour information, Histograms of Oriented Gradients (HOG) may be used, for example.

In the feature information in FIG. 6, the average value of the individual colors (R, G, B) in an area of each part is extracted as a feature quantity. For example, the average value of the color of the area 511 of the hair is (10, 11, 10). In place of the average value in RGB, the other statistical values, such as the median, the maximum value, the minimum value, or the like may be used.

Also, it is possible to record a plurality of colors as a feature quantity of the area of each part. In this case, it is possible for the feature extraction unit 303 to divide the color of an area into a plurality of part areas based on the similarity of color, to determine a predetermined number of part areas in descending order of the size of the area, and to record the statistical value of the color of each part area as a feature quantity.

The certainty factor calculation unit 301 calculates a certainty factor for each part of the body, and generates certainty factor information 313 indicating certainty factors of a plurality of parts. The certainty factor of each part is an index indicating the certainty of the comparison result of the comparison between the two person images based on the feature quantities of the area of the part. The higher the certainty factor, the higher the possibility of correctness of the comparison result, and the lower the certainty factor, the lower the possibility of correctness of the comparison result.

The comparison unit 112 compares the person image 121 and the object image 311-1 to object image 311-N using the feature information 312-0 to the feature information 312-N and the certainty factor information 313, and identifies an object image corresponding to the person image 121. Then the comparison unit 112 generates a comparison result 314 indicating the identified object image, and the output unit 113 outputs the comparison result 314.

At this time, the comparison unit 112 calculates the similarity degree between a feature quantity of a part having a large certainty factor among the feature quantities of a plurality of parts included in the feature information 312-0, and a feature quantity of the same part included in the feature information 312-$i$ ($i=1$ to N), for example. Then it is possible for the comparison unit 112 to identify the object image 311-$i$ corresponding to the maximum value of the similarity degree as an object image corresponding to the person image 121.

Incidentally, it is possible for the part identification unit 302 to generate the map image 502 in which the parts are distinguished based on the feature quantities of the individual parts included in the person image 501 in FIG. 5. For example, if a color range (upper limit value and lower limit value) for each part is given, it is possible to identify an area of a corresponding part by connecting adjacent pixels having the given range of color with each other so as to identify the area of the corresponding part. Then in the map image 502, the statistical value (the average value, or the like) of the color of the pixels are given to all the pixels of each part as a feature quantity.

However, a partial part is sometimes not included in a person image depending on a photographing environment, such as setting conditions of a camera, and the like. For example, if a person is blocked by another person or an object so that a specific part is hidden, that part is not included in the person image. In this case, an image of the other person or the object is included in an area in which an image of the part ought to be originally included, and the feature quantity of that area is not suitable for calculating the similarity degree.

Also, if a picture of a person looking downward is taken, the face of the person is sometimes not included in the person image. In this case, the image of a head top part is included in an area where the face of the person ought to be included, and thus the feature quantity of that area is not suitable for calculating the similarity degree of the face.

In this manner, if the feature quantity of an area corresponding to a certain part in a person image is not suitable for calculating the similarity degree, a pixel having the color range given to the part is not detected, and thus the feature quantity of that part is missing from the map image.

Figure 7:
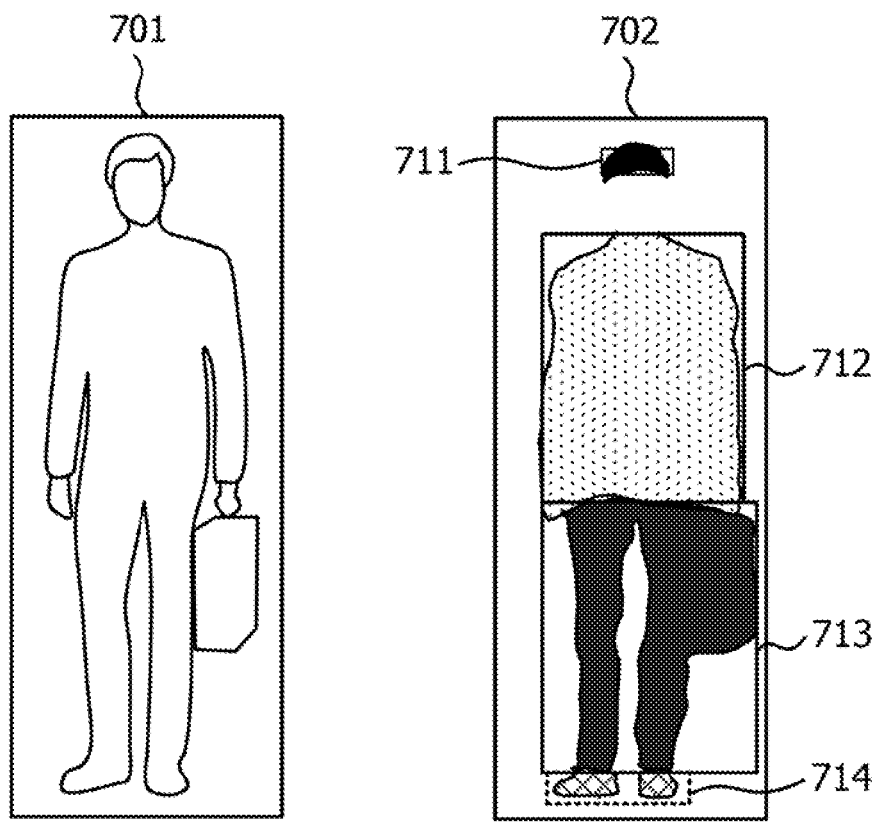
FIG. 7 is a diagram illustrating a person image from which the feature quantity of a face is missing.

FIG. 7 illustrates an example of a person image from which the feature quantity of a face is missing. In a person image 701, if a part of a face of a person is hidden by some kind of obstacle, it becomes difficult to identify the face part, and thus the feature quantity of the face is missing from a map image 702. The map image 702 includes an area 711 corresponding to hair, an area 712 corresponding to an upper body, an area 713 corresponding to a lower body, and an area 714 corresponding to shoes, but does not include an area corresponding to the face. In this case, the feature extraction unit 303 records values (−1, −1, −1) indicating that the feature quantity is missing in place of the feature quantity of the face in the feature information in FIG. 6.

If the feature quantity of a partial part is missing from any one of the feature information 312-1 to feature information 312-N, the comparison unit 112 obtains an alternative value of the similarity degree of the missing part based on the certainty factor of each part. Then the comparison unit 112 uses the obtained alternative value as the similarity degree of the part, and compares the person image 121 with the object image 311-1 to the object image 311-N.

In parts of a person's body, there are parts having a high possibility of allowing to identify whether the same person or not, and parts having a low possibility. For example, among three parts, namely a face, an upper body, and shoes, when the similarity degree of the feature quantity of the face is high, there is a high possibility of the same person. On the other hand, when the similarity degree of the feature quantity of the shoes is high, even if the similarity degree is considerably high, the possibility of the same person becomes low compared with the case where the similarity degree of the feature quantity of a face is high. Accordingly, it is thought that the certainty factor of a face is higher than the certainty factor of shoes.

Between two parts having a high certainty factor, there is little chance that the magnitude relation of the similarity degrees indicated by the feature quantities of a plurality of object images changes compared with a part having a low certainty factor. For example, when the certainty factors of the face and the upper body are relatively high, if the similarity degree of the face of a person X is higher in descending order of the person A, the person B, and the person C, it often happens that the similarity degree of the upper body of the person X is higher in descending order of the person A, the person B, and the person C.

Here, consider the case where the feature quantity of the face of the person B and the feature quantities of the upper bodies of the person A and the person B are extracted, but the feature quantity of the face of the person A is missing. In this case, if the similarity degree of the upper body of the person A is higher than the similarity degree of the upper body of the person B, it is expected that the similarity degree of the face of the person A is higher than the similarity degree of the face of the person B. Thus, it is preferable to set a higher value than the similarity degree of the face of the person B as an alternative value of the similarity degree of the face of the person A.

In this manner, even if the feature quantity of the area corresponding to a certain part in the object image 311-$i$ is not suitable for calculating the similarity degree, it becomes possible to compare the person image 121 and the object image 311-$i$ with high precision by setting a suitable alternative value as the similarity degree of the part. Thereby, it is possible to identify an object image that is most similar to the person image 121 out of the object image 311-1 to the object image 311-N.

Figure 8:
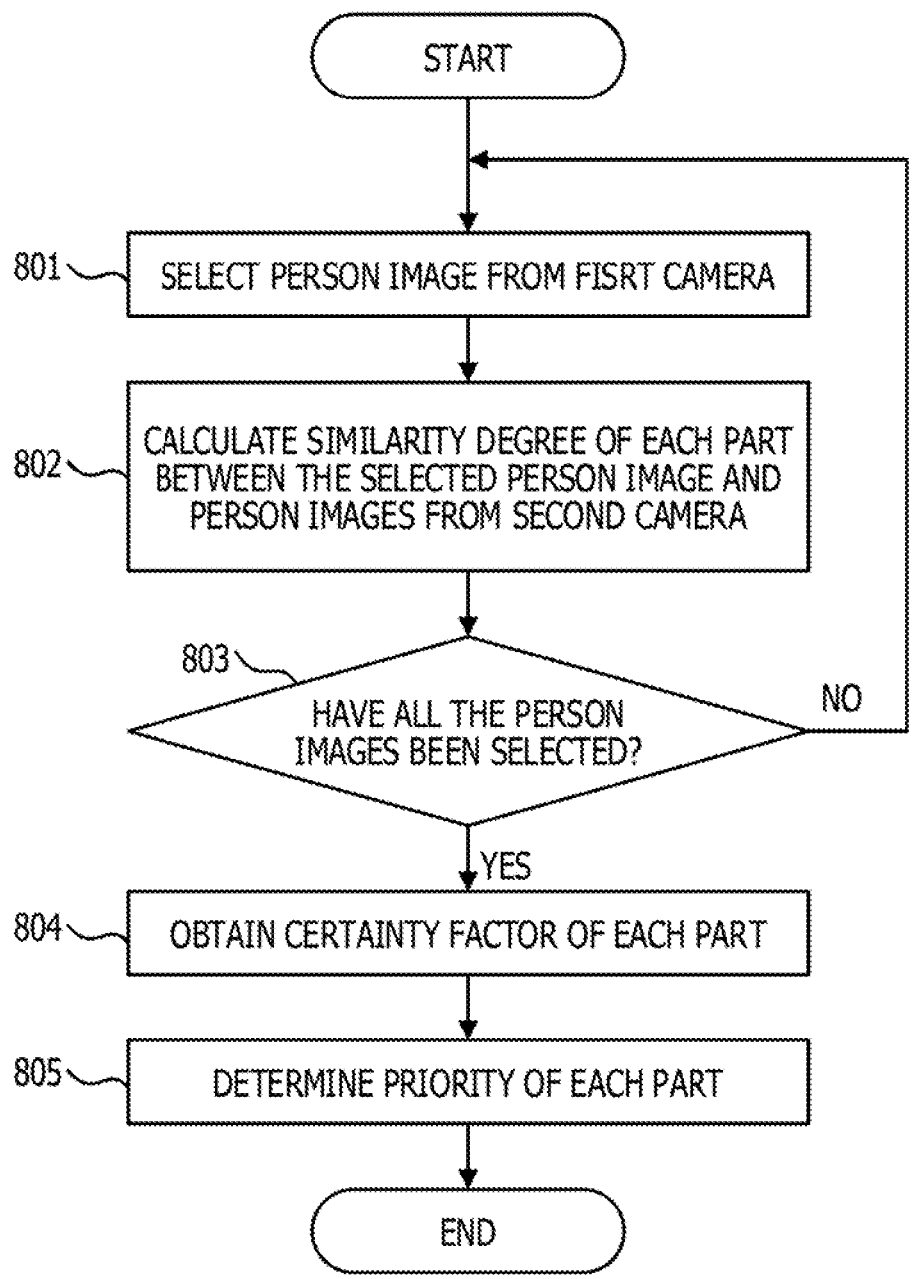
FIG. 8 is a flowchart of certainty factor calculation processing.
Figure 9:
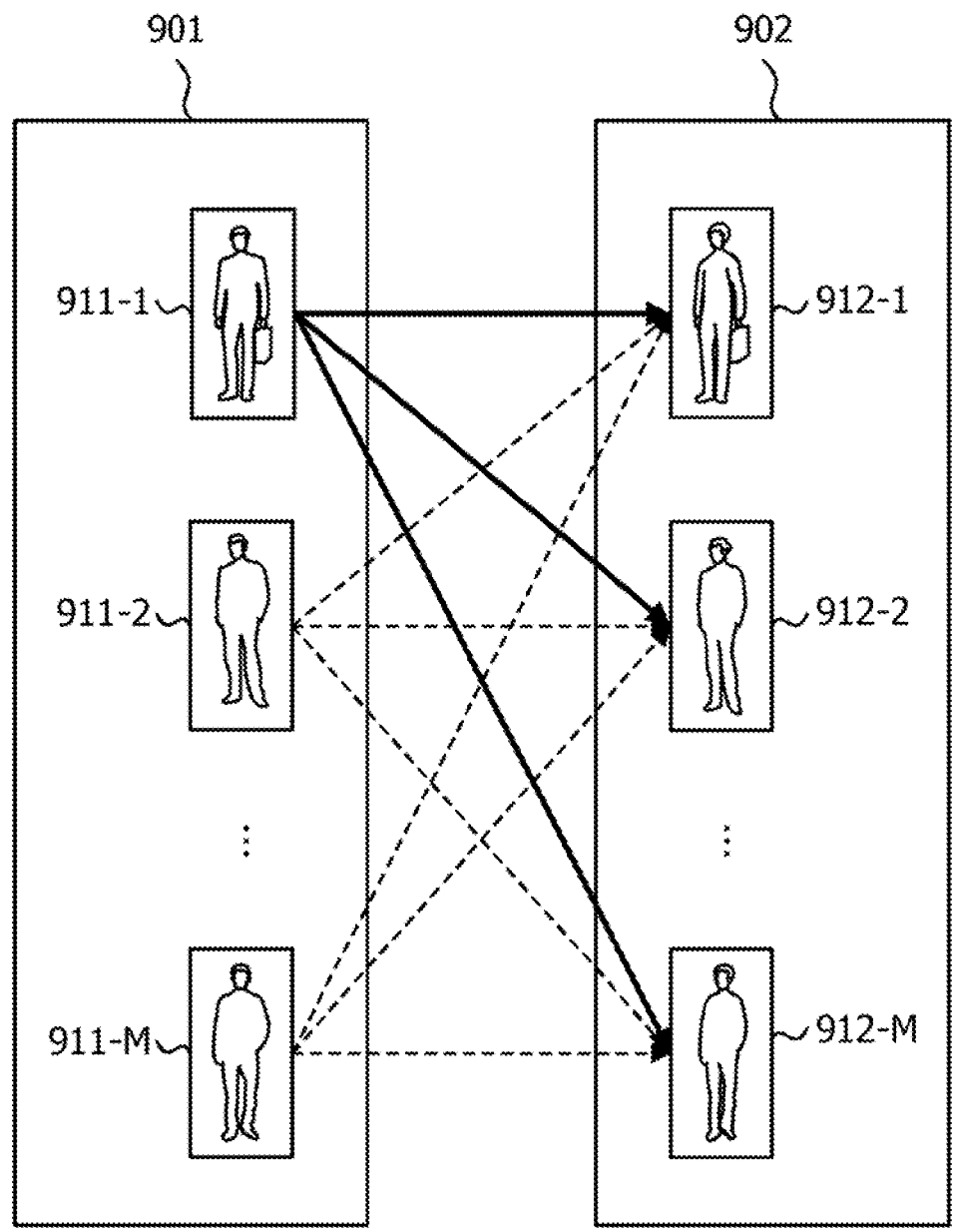
FIG. 9 is a diagram illustrating a sample of person images captured by two cameras.

FIG. 8 is a flowchart illustrating certainty factor calculation processing performed by the certainty factor calculation unit 301. As illustrated in FIG. 9, in the certainty factor calculation processing, a certainty factor of each part of a body is calculated using a person image group 901 including M persons (M is an integer of 2 or more) captured by the first camera, and a person image group 902 including the same M persons captured by the second camera as a sample. The person image group 901 includes a person image 911-1 to a person image 911-M, and the person image group 902 includes a person image 912-1 to a person image 912-M. It is desirable that the sample number M is a sufficiently large integer.

The persons in the person image 911-1 to the person image 911-M and the person image 912-1 to the person image 912-M are individually known, and the storage unit 111 stores information indicating correct association between the person images captured by the two cameras with each other in advance. Further, the storage unit 111 stores the feature quantities of the individual parts extracted from the individual person images.

First, the certainty factor calculation unit 301 selects a person image to be processed from the person image group 901 (step 801). Then the certainty factor calculation unit 301 calculates the similarity degree of a feature quantity of each part between the selected person image and each person image in the person image group 902, and identifies a person image in the person image group 902, which corresponds to the maximum value of the similarity degree for each part (step 802).

For example, when the feature quantity of a face is used, the certainty factor calculation unit 301 calculates the similarity degrees between the feature quantity of the face of the selected person image, and the feature quantity of the face of each person image in the person image group 902, and associates a person image in the person image group 902, which corresponds to the maximum value of the similarity degree, with the selected person image. Regarding the parts, such as hair, an upper body, a lower body, shoes, and the like, it is possible to identify a person image in the person image group 902 that corresponds to the selected person image in the same manner. The person images associated in this manner are sometimes different for each part.

Next, the certainty factor calculation unit 301 checks whether all the person images in the person image group 901 have been selected or not (step 803), and if there is an unselected person image (step 803, NO), the certainty factor calculation unit 301 repeats the processing of step 801 and after that for the next person image.

If all the person images in the person image group 901 have been selected (step 803, YES), the certainty factor calculation unit 301 compares an association result of each person image for each part with a correct association, and obtains a certainty factor of each part (step 804). At this time, it is possible for the certainty factor calculation unit 301 to obtain a ratio of the number of person images having a correct association to M, which is the number of person images in the person image group 901, as a certainty factor.

For example, if 80 person images out of 100 person images in the person image group 901 are associated with the corresponding correct person images in the person image group 902 using the feature quantities of the face, the certainty factor of the face becomes 80%. For the other parts, it is possible to obtain ratios of the person images having been associated correctly as certainty factors in the same manner.

Next, the certainty factor calculation unit 301 determines a priority of each part at the time of comparing the person image 121 with the object image 311-1 to the object image 311-N in accordance with the certainty factor of each part (step 805). At this time, it is possible for the certainty factor calculation unit 301 to determine priorities in descending order of the size of the certainty factors. Then the certainty factor calculation unit 301 generates the certainty factor information 313 indicating the certainty factor and the priority of each part, and stores the certainty factor information 313 in the storage unit 111.

FIG. 10 illustrates an example of the certainty factor information 313 regarding three parts, namely a face, shoes, and hair. In this example, the certainty factors for a face, shoes, and hair are 80%, 60%, and 40%, respectively, and the priorities of a face, shoes, and hair are the first, the second, and the third, respectively.

Figure 11:
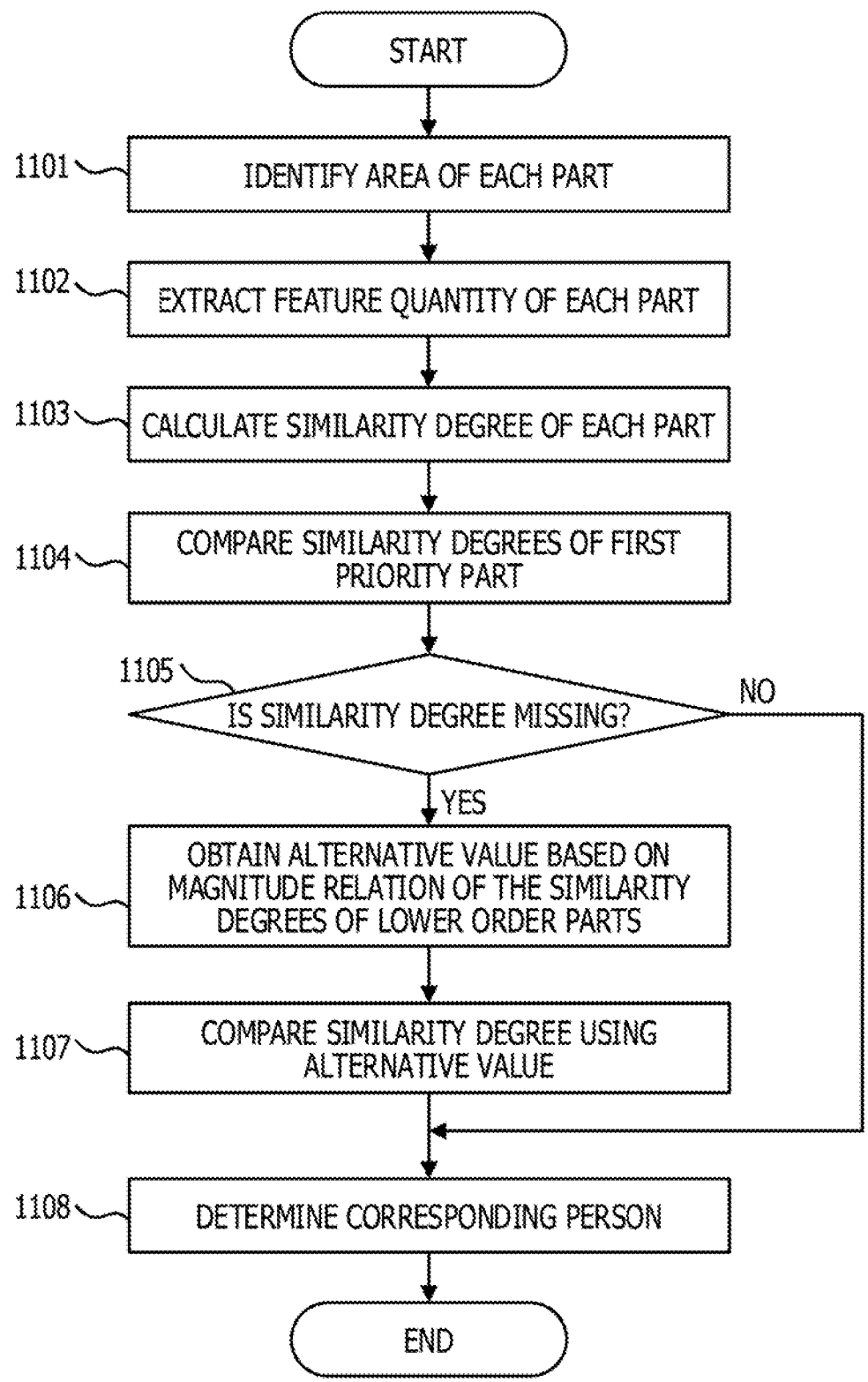
FIG. 11 is a flowchart illustrating a specific example of image processing.

FIG. 11 is a flowchart illustrating a specific example of image processing performed by the image processing apparatus 101 in FIG. 3 after the certainty factor information 313 is generated. First, the part identification unit 302 identifies an area corresponding to each part of a body from each of the person image 121 and the object image 311-1 to the object image 311-N, and generates a map image segmented into a plurality of areas (step 1101).

Next, the feature extraction unit 303 extracts a feature quantity from an area of each part in the map image generated from each of the person image 121 and the object image 311-1 to the object image 311-N, and generates the feature information 312-0 to the feature information 312-N (step 1102).

Next, the comparison unit 112 calculates a similarity degree of the feature quantity of each part between the feature information 312-0 and the feature information 312-1 to the feature information 312-N (step 1103). Here, if the feature quantity of any one of the parts of the feature information 312-$i$ is missing, the calculation of the similarity degree of the part is omitted.

FIG. 12 illustrates an example of the similarity degrees of the face, the shoes, and the hair that are calculated between the image A1 and the image A2 to the image D2 in FIG. 4. In this example, the feature quantities of the face and the hair in the image A2 are missing, and thus the similarity degrees of the face and the hair in the image A2 are missing. In the same manner, the feature quantity of the shoes in the image D2 is missing, and thus the similarity degree of the shoes in the image D2 is missing. The similarity degrees in any parts are not higher than 100.

Next, the comparison unit 112 compares the similarity degree of the first part among the similarity degrees of the individual parts calculated individually from the feature information 312-1 to the feature information 312-N in accordance with the priorities indicated in the certainty factor information 313 (step 1104). Then the comparison unit 112 checks whether the similarity degree regarding the part is missing or not (step 1105).

If the similarity degree is not missing (step 1105, NO), the comparison unit 112 identifies an object image corresponding to the person image 121 based on the similarity degree of the first part (step 1108). In this case, the comparison unit 112 compares the similarity degrees of the first part among the image A2 to the image D2, and identifies an image corresponding to the maximum value of the similarity degree as the object image corresponding to the image A1. Then the comparison unit 112 generates the comparison result 314 indicating the person of the identified person image, and the output unit 113 outputs the comparison result 314.

On the other hand, if the similarity degree is missing (step 1105, YES), the comparison unit 112 obtains an alternative value of the similarity degree of the missing part based on the magnitude relation of the similarity degree of the second part or less (step 1106). For the magnitude relation of the similarity degree, it is desirable to use the magnitude relation of the similarity degree of a part having a priority as close to the first as possible.

For example, if the first part is a face, and the second part is shoes, an alternative value of the similarity degree of the face is set such that the magnitude relation of the similarity degree of the face matches the magnitude relation of the similarity degree of the shoes among the image A2 to the image D2.

Then the comparison unit 112 compares the similarity degrees of the object image 311-1 to the object image 311-N using the obtained alternative value as the similarity degree of the first part (step 1107), and performs the processing in step 1108.

For example, if the certainty factor information in FIG. 10 is used, the priorities of a face, shoes, and hair are the first, the second, and the third, respectively. Thus, the comparison unit 112 compares the similarity degrees of the face having the first priority among the image A2 to the image D2 in FIG. 12. Here, it is understood that the similarity degree of the face in the image A2 is missing, and the similarity degree 80 of the face in the image C2 is the maximum value among the remaining image B2 to image D2. Accordingly, the candidate image corresponding to the image A1 is narrowed down to the image A2 and the image C2.

The similarity degree of the face in the image A2 is missing, and thus the comparison unit 112 compares the similarity degrees of the shoes having the second priority. Here, it is understood that although the similarity degree of the shoes in the image D2 is missing, the similarity degrees of the shoes of the image A2 and the image C2 are not missing. Thus, the comparison unit 112 obtains an alternative value of the similarity degree of the face in the image A2 by the following expression using the similarity degree 80 of the face in the image C2, and a ratio 50/10 of the similarity degree 50 of the shoes in the image A2 to the similarity degree 10 of the shoes in the image C2.

$$80 \times (50/10) = 400 \tag{1}$$

Here, if it is assumed that the upper limit value of the similarity degree is 100, the comparison unit 112 corrects the obtained alternative value 400 to the upper limit value of 100, and sets the alternative value 100 in the similarity degree of the face in the image A2. As a result, the similarity degree of the face in the image A2 becomes higher than the similarity degree of the face in the image C2, and thus the image corresponding to the image A1 is determined to be the image A2.

It is possible for the comparison unit 112 to further obtain an alternative value of the similarity degree of the face in the image A2 using the similarity degree of the face and the shoes in the image B2. In this case, the comparison unit 112 obtains the average value of the similarity degree 10 of the shoes in the image B2 and the similarity degree 10 of the shoes in the image C2 by the following expression.

$$(10+10)/2 = 10 \tag{2}$$

Also, the comparison unit 112 obtains the average value of the similarity degree 65 of the face in the image B2 and the similarity degree 80 of the face in the image C2 by the following expression.

$$(65+80)/2 = 72.5 \tag{3}$$

Then the comparison unit 112 obtains an alternative value of the similarity degree of the face in the image A2 by the following expression using the average value 72.5 in Expression (3), and the ratio 50/10 of the similarity degree 50 of the shoes in the image A2 to the average value 10 in Expression (2).

$$72.5 \times (50/10) = 362.5 \tag{4}$$

The comparison unit 112 modifies the obtained alternative value 362.5 to the upper limit value of 100, and sets the alternative value 100 in the similarity degree of the face in the image A2.

It is also possible for the comparison unit 112 to further obtain an alternative value of the similarity degree of the face in the image A2 using the certainty factors of the face and the shoes. In this case, the comparison unit 112 reflects the certainty factors on the similarity degrees of the shoes in the image A2 to the image C2 by the following expression.

$$A2: 50 \times 60\% = 30 \tag{5}$$

$$B2: 10 \times 60\% = 6 \tag{6}$$

$$C2: 10 \times 60\% = 6 \tag{7}$$

Next, the comparison unit 112 obtains the average value of the similarity degree 10 in Expression (6) and the similarity degree 10 in Expression (7) by the following expression.

$$(6+6)/2 = 6 \tag{8}$$

Also, the comparison unit 112 reflects the certainty factor on the similarity degrees of the faces in the image B2 and the image C2 by the following expression.

$$B2: 65 \times 80\% = 52 \tag{9}$$

$$C2: 80 \times 80\% = 64 \tag{10}$$

Next, the comparison unit 112 obtains the average value of the similarity degree 52 in Expression (9) and the similarity degree 64 in Expression (10) by the following expression.

$$(52+64)/2 = 58 \tag{11}$$

Then the comparison unit 112 obtains an alternative value of the similarity degree of the face in the image A2 by the following expression using the average value 58 in Expression (11), and the ratio 30/6 of the similarity degree 30 in Expression (5) to the average value 6 in Expression (8).

$$58 \times (30/6) = 290 \tag{12}$$

The comparison unit 112 modifies the obtained alternative value 290 to the upper limit value of 100, and sets the alternative value 100 in the similarity degree of the face in the image A2.

With the image processing in FIG. 11, if the feature quantity of the part having the maximum certainty factor is not missing, it is possible to identify an object image corresponding to the person image 121 based on the similarity degree of the part.

Also, even if the feature quantity of the part having the maximum certainty factor is missing, it becomes possible to identify an object image corresponding to the person image 121 by setting a pseudo similarity degree of the part. In this case, it is possible to set a suitable value as the pseudo similarity degree by referencing the magnitude relation of the similarity degree of the second part or lower.

The configurations of the image processing apparatus 101 in FIG. 1 and FIG. 3 are only examples, and a part of the components may be omitted or changed in accordance with the application and the conditions of the image processing apparatus 101. For example, if the certainty factor information 313 is not used, or another information processing apparatus performs the certainty factor calculation processing, it is possible to omit the certainty factor calculation unit 301 in FIG. 3. Also, if another information processing apparatus generates the feature information 312-0 to the feature information 312-N, it is possible to omit the part identification unit 302 and the feature extraction unit 303 in FIG. 3.

The images in FIG. 4, FIG. 5, FIG. 7, and FIG. 9 are only examples, and another image may be used in accordance with the application and the conditions of the image processing apparatus 101. For example, in place of the two images captured by the two cameras in FIG. 4, two images captured by one camera at two different times may be used. In the same manner, in place of the plurality of person images captured by the two cameras in FIG. 9, a plurality of person images captured by one camera at two different times may be used as a sample.

The shape of the area 511 to the area 515 in FIG. 5 may be a shape other than a rectangle. The part identification unit 302 may divide the person image 501 in FIG. 5 into areas of different kinds of or different number of parts in place of the area 511 to the area 515.

The feature information in FIG. 6, the certainty factor information in FIG. 10, and the similarity degree in FIG. 12 are only examples, and information having the other data structures may be used. For example, the start point coordinates (sx, sy) and the end point coordinates (ex, ey) in FIG. 6 may be omitted, and a feature quantity other than RGB may be used.

The flowcharts in FIG. 2, FIG. 8, and FIG. 11 are only examples, and a part of the processing may omitted or changed in accordance with the configuration and conditions of the image processing apparatus 101. For example, in step 801 to step 803 in FIG. 8, the certainty factor calculation unit 301 may use a plurality of person images captured by one camera at two different times as a sample in place of the a plurality of person images captured by the two cameras. In the same manner, in the image processing in FIG. 11, the object image 311-$i$ captured by the same camera as that used for the person image 121 at different times may be used in place of the object image 311-$i$ captured by a different camera from that used for the person image 121.

In step 1104 and step 1107 in FIG. 11, the comparison unit 112 may compare the similarity degree having a predetermined priority of the second or lower in place of comparing the similarity degree of the part having the first priority. Alternatively, the comparison unit 112 may compare an addition result produced by adding the similarity degrees of a plurality of priorities including the first priority, which are weighted in accordance with the certainty factors, respectively.

Expression (1) to Expression (12) are only examples, and an alternative value of the similarity degree of a missing part may be calculated by the other calculation expressions.

Figure 13:
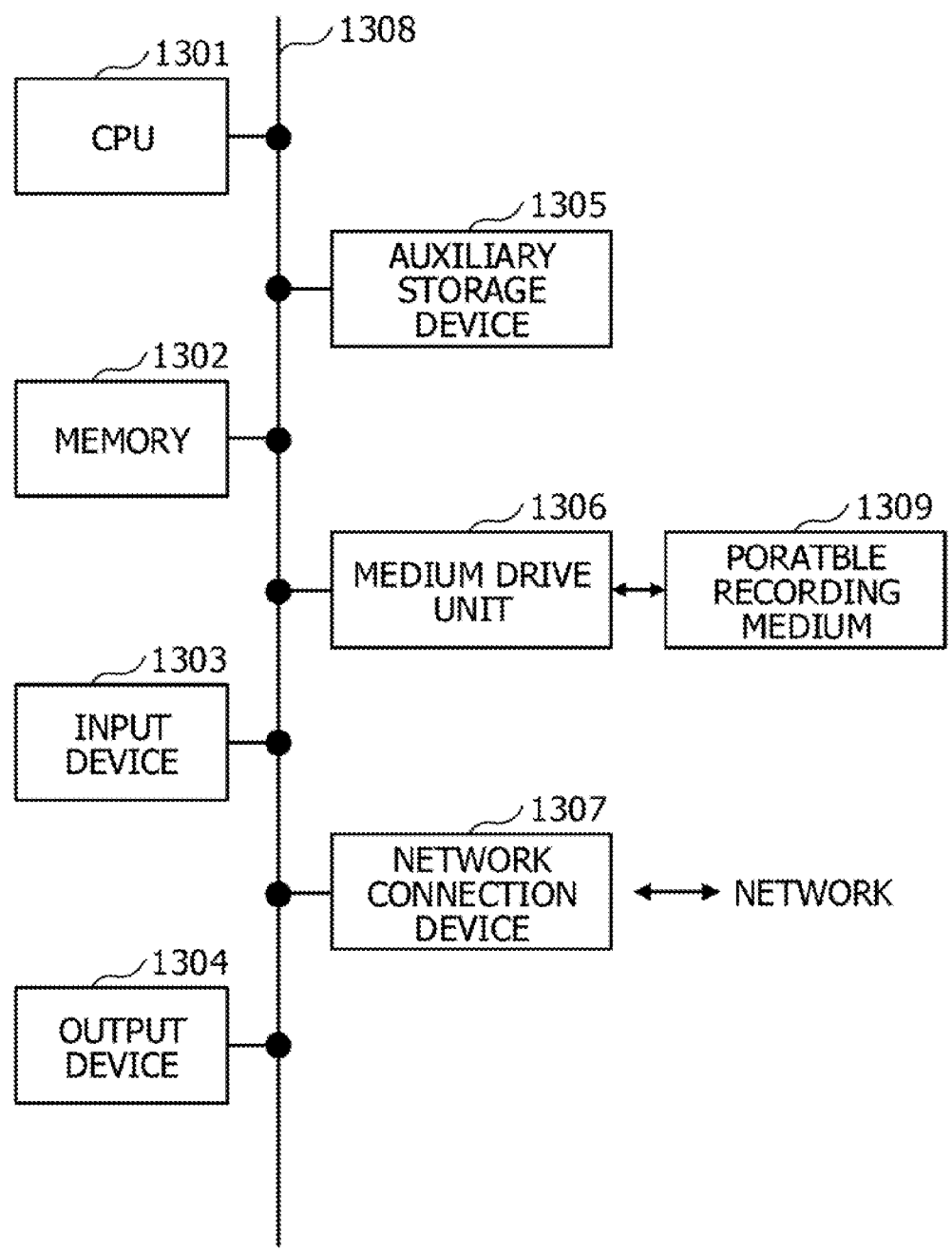
FIG. 13 is a hardware configuration diagram of an information processing apparatus.

FIG. 13 illustrates an example of a configuration of an information processing apparatus used as the image processing apparatus 101 in FIG. 1 and FIG. 3. The information processing apparatus in FIG. 13 includes a CPU 1301, a memory 1302, an input device 1303, an output device 1304, an auxiliary storage device 1305, a medium drive unit 1306, and a network connection device 1307. These components are coupled with one another through a bus 1308.

The memory 1302 is a semiconductor memory, for example, a read only memory (ROM), a random access memory (RAM), a flash memory, or the like, and stores program and data used for processing. It is possible to use the memory 1302 as the storage unit 111 in FIG. 1 and FIG. 3.

The CPU 1301 (processor) executes a program using the memory 1302, for example, so as to operate the comparison unit 112, the certainty factor calculation unit 301, the part identification unit 302, and the feature extraction unit 303 in FIG. 1 and FIG. 3.

The input device 1303 is, for example, a keyboard, a pointing device, or the like, and is used for inputting an instruction and information from an operator or a user. The output device 1304 is, for example, a display device, a printer, a speaker, or the like, and is used for outputting an inquiry or an instruction, and a processing result to an operator or a user. It is possible to use the output device 1304 as the output unit 113 in FIG. 1 and FIG. 3, and the processing result may be the comparison result 314.

The auxiliary storage device 1305 is, for example, a magnetic disk device, an optical disc device, a magneto-optical disc device, a tape device, or the like. The auxiliary storage device 1305 may be a hard disk drive or a flash memory. It is possible for the information processing apparatus to store a program and data in the auxiliary storage device 1305, and to load the program and the data onto the memory 1302 to use them. It is possible to use the auxiliary storage device 1305 as the storage unit 111 in FIG. 1 and FIG. 3.

The medium drive unit 1306 drives the portable recording medium 1309, and accesses its recording contents. The portable recording medium 1309 is a memory device, a flexible disk, an optical disc, a magneto-optical disc, or the like. The portable recording medium 1309 may be a compact disk read only memory (CD-ROM), a digital versatile disk (DVD), a universal serial bus (USB) memory, or the like. It is possible for an operator or a user to store a program and data into the portable recording medium 1309, and to load the program and the data into the memory 1302 to use them.

In this manner, the computer-readable recording medium that stores the program and the data used for the processing is a physical (non-temporary) recording medium, such as the memory 1302, the auxiliary storage device 1305, or the portable recording medium 1309.

The network connection device 1307 is coupled to a communication network, such as a local area network, a wide area network, or the like, and is a communication interface that performs data conversion associated with communication. The information processing apparatus receives a program and data from an external device through the network connection device 1307, and is capable of using the program and the data by loading them into the memory 1302.

It is possible for the information processing apparatus to receive a processing request from a user terminal through the network connection device 1307, to perform image processing, and to transmit the comparison result 314 to the user terminal. In this case, it is possible to use the network connection device 1307 as the output unit 113 in FIG. 1 and FIG. 3.

In this regard, the information processing apparatus does not have to include all the components in FIG. 13, and is capable of omitting a part of the components in accordance with an application and conditions. For example, when the information processing apparatus receives a processing request from a user terminal through a communication network, the input device 1303 and the output device 1304 may be omitted. Also, if the portable recording medium 1309 or the communication network is not used, the medium drive unit 1306 or the network connection device 1307 may be omitted.

If the information processing apparatus includes a mobile terminal having a call feature, such as a smartphone, the information processing apparatus may include a calling device, such as a microphone or a speaker, and an image capture apparatus, such as a camera.

The detailed descriptions have been given of the disclosed embodiments and the advantages thereof. It will be obvious to those skilled in the art that various changes, additions, and omissions are possible without departing from the spirit and scope clearly described in the appended claims in the present disclosure.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An image processing apparatus comprising:
a memory; and
a processor coupled to the memory and configured to:
 obtain a person image including a first area and a second area,
 obtain a plurality of object images corresponding to a plurality of persons, respectively, the plurality of object images including a first object image including a third area corresponding to the first area and a fourth area corresponding to the second area, and a second object image including a fifth area corresponding to the first area and a sixth area corresponding to the second area, and
 when a feature quantity of the third area is not suitable for calculating a similarity degree,
 calculate a first similarity degree between a feature quantity of the first area and a feature quantity of the fifth area,
 calculate a second similarity degree between a feature quantity of the second area and a feature quantity of the fourth area,
 calculate a third similarity degree between a feature quantity of the second area and a feature quantity of the sixth area,
 obtain a fourth similarity degree between a feature quantity of the first area and a feature quantity of the third area based on the first similarity degree, the second similarity degree, and the third similarity degree,
 generate a comparison result of comparison between the person image and the plurality of object images based on the first similarity degree and the fourth similarity degree, and
 identify one of the plurality of object images corresponding to the person image from among the plurality of object images in accordance with the comparison result.

2. The image processing apparatus according to claim 1, wherein
the first area, the third area, and the fifth area are areas corresponding to a face of a person, and
the second area, the fourth area, and the sixth area are areas corresponding to parts other than the face.

* * * * *